April 4, 1967     O. T. CASEBEER ET AL     3,312,086

MULTILAMP SLAVE FLASH UNIT

Filed July 23, 1965     2 Sheets-Sheet 1

DONALD M. HARVEY
LAWRENCE M. WOOD
ORAN T. CASEBEER
INVENTORS

BY R. Frank Smith
Robert T. Crocker

ATTORNEYS

April 4, 1967     O. T. CASEBEER ET AL     3,312,086
MULTILAMP SLAVE FLASH UNIT

Filed July 23, 1965     2 Sheets-Sheet 2

DONALD M. HARVEY
LAWRENCE M. WOOD
ORAN T. CASEBEER
INVENTORS

BY *R. Frank Smith*
*Robert T. Cooker*

ATTORNEYS

United States Patent Office 3,312,086
Patented Apr. 4, 1967

3,312,086
MULTILAMP SLAVE FLASH UNIT
Oran T. Casebeer, Interlaken, Lawrence M. Wood, Rochester, and Donald M. Harvey, Webster, N.Y., assignors to Eastman Kodak Company, Rochester, N.Y., a corporation of New Jersey
Filed July 23, 1965, Ser. No. 474,337
14 Claims. (Cl. 67—31)

This invention relates to an improved slave flash unit of the type used for flash photography and more particularly to such a unit for use with a multilamp photoflash package containing a plurality of individually controllable photoflash lamps.

In flash photography, it is common to use a plurality of photoflash lamps, one of which is normally triggered by the camera mechanism and is commonly referred to as the master unit, and the other of which is termed a slave unit and is fired automatically in response to the firing of the master unit. Where more than one photographic shot is to be taken, normally it required at the slave station the use of a relatively expensive gas discharge lamp and associated power supply, or that a new flash bulb be manually inserted at the slave station before each new shot.

It is an object of the present invention to provide an improved slave flash unit which will overcome the above disadvantages.

A further object is to provide such a slave flash unit which is completely self-contained, is of relatively compact, inexpensive construction, and is extremely reliable in operation.

In accordance with our invention the slave flash unit carries a plurality of flash bulbs which may be brought one at a time into readiness for firing. Firing of the bulbs is under the control of a photoelectric cell carried by the unit, together with associated circuitry which is responsive to a sudden increase in illumination falling on the cell to cause the firing of a bulb. Each time a bulb is fired the next bulb to be fired is automatically brought into readiness for such firing. In the interest of compactness, the unit preferably utilizes solid state components in the electrical circuitry. The unit also preferably includes an indicator light which shows at any time, by its illumination, that the unit is actually in condition for firing of a bulb.

The invention will be more clearly understood from a consideration of the following description, especially when taken in the light of the appended claims and of the accompanying drawing.

Figure 2:
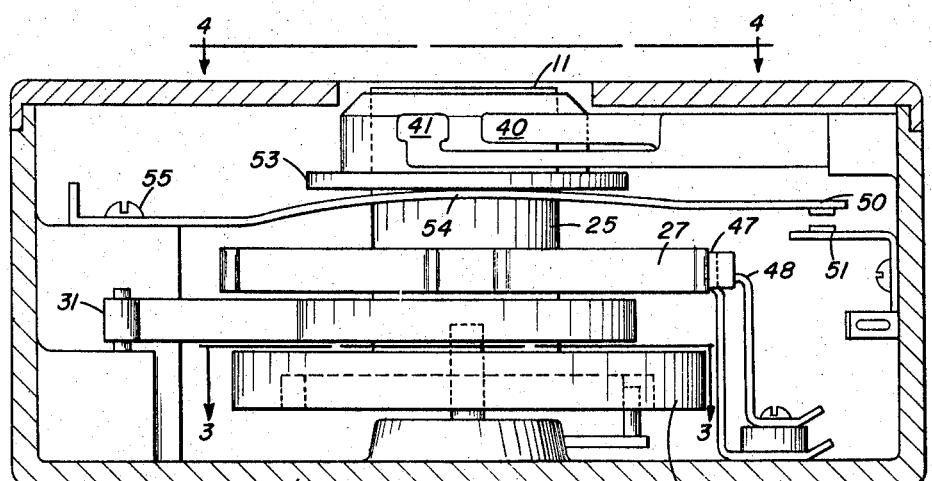
FIGURE 2 is a transverse section through the unit.
Figure 4:
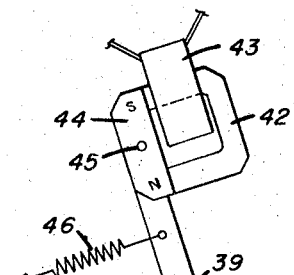
Figure 4:
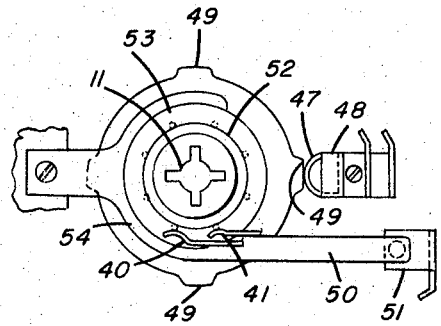
Figure 3:
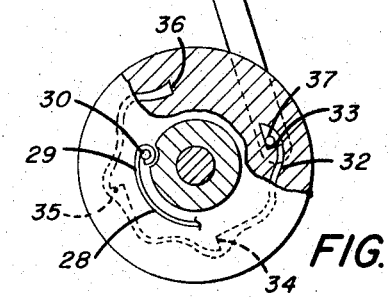

FIGURES 3 and 4 are fragmentary sectional views taken on the lines 3—3 and 4—4 respectively of FIGURE 2.

Figure 5:
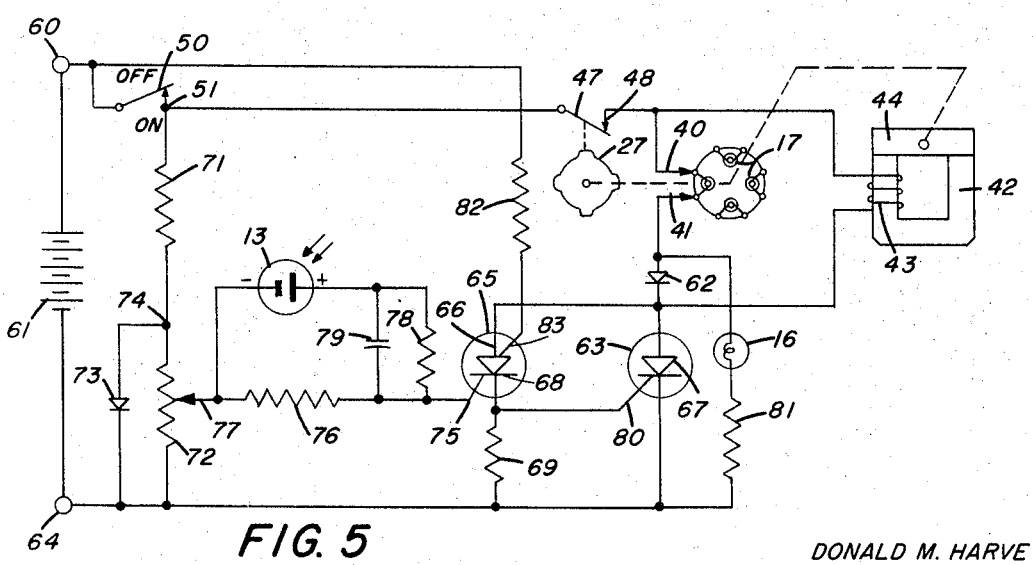

FIGURE 5 is a schematic diagram of the electrical circuitry incorporated in my unit.

Figure 1:
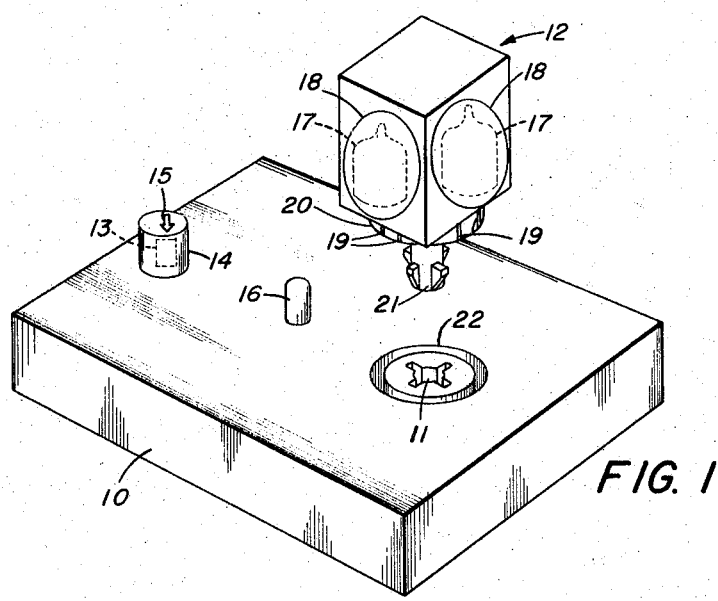
FIGURE 1 shows a perspective view of my improved slave flash unit together with a multilamp photoflash unit in position to be inserted therein.

As shown in FIGURE 1 our improved slave flash unit comprises a housing 10 carrying a rotatable socket 11 adapted to receive a multilamp flash unit 12. The unit is also provided with a photocell 13 molded in a plastic cylinder 14 which is rotatable about its axis for the purpose of directing the sensitive surface of the photocell in the desired direction. Conveniently cylinder 14 is provided with an arrow 15 which will assist the operator in directing the cell as desired. The unit further includes an indicator lamp 16 which is arranged to be illuminated whenever a flash bulb is in proper condition for firing.

The flash unit 12 is illustrated as being of a recently developed type which is disclosed, for example, in United States patent applications, Franklin D. Kottler et al., Serial No. 417,914, and Dean M. Peterson et al., Serial No. 417,913, both filed December 14, 1964. As shown in FIGURE 1 and as further disclosed in the above-mentioned applications, this unit incorporates four small flash bulbs 17, of the AG-1 type, each provided with an individual reflector 18 and depending leads 19. The leads 19 extend in spaced relationship around a contact ring 20 which depends below the bottom of the main cubical portion of the unit. The unit is also provided with a splined extension 21 which is adapted to mate with corresponding slots 22 in the socket 11.

The socket 11 itself is carried on the upper end of a post 25 rotatably mounted on the housing and carrying adjacent its lower end a detent disc 26. Spaced slightly above disc 26 is a second cam disc 27 and between the two discs is arranged a spiral spring 28, the inner end 29 of which is secured as at 30 to the socket assembly and the outer end 31 of which is secured to the housing as indicated in FIGURE 2. Spring 28 is wound in such direction and is under sufficient tension as to constantly tend to rotate the post and socket assembly in a counterclockwise direction as viewed in FIGURES 1, 3, and 4.

Spring 28 and detent disc 26 in conjunction with a solenoid actuated stepping or release mechanism serve to hold the rotatable post and socket assembly in any of four selected positions in each of which one of the flash bulbs 17 is in firing position. This arrangement is similar to that disclosed in the copending U.S. patent application of David E. Beach, Ser. No. 471,009, filed July 12, 1965. As described in the above-mentioned application, disc 26 is provided with a slot 32 having therein four orthogonally related abutments 33–36 inclusive and which are adapted to be selectively engaged by a detent pin 37 carried on the end of a control lever 38 pivoted to the housing as at 39. As previously indicated, when any of the abutments 33 to 36 is held against the detent pin 37, the socket will be so oriented that the leads 19 of the corresponding flash bulb 17 will be in electrical contact with a pair of firing contact springs 40 and 41. Movement of the detent lever 38 between its holding and release positions is controlled by the magnetic interaction between the core 42 of a release or stepping solenoid 43 and a permanent magnet 44 pivotally carried as at 45 at the end of lever 38. The arrangement is such that the normal attraction between magnet 44 and core 42, when solenoid 43 is de-energized, will hold the lever in its locking position wherein detent 37 is in engagement with one or another of the abutments 33 to 36. When the solenoid is energized, the core 42 becomes magnetized with such polarity as to repel magnet 44 and swing lever 38 in a counterclockwise direction as seen in FIGURE 3 so that the pin 37 will free the particular abutment against which it had been engaged. In order to equalize the forces involved, a light tension spring 46 may be provided to partially counteract the normal attraction between the magnet 44 and core 42.

As best shown in FIGURES 2 and 4 cam disc 27 is provided with four lobes 49, one of which is adapted, in each bulb firing position of the socket assembly, to engage and hold closed the contacts 47 and 48 of a reset switch. This switch is arranged so that as the socket assembly rotates between one bulb firing position and the next, the contacts 47 and 48 will be opened and reset the electrical circuitry for the next operation, as will be explained in greater detail herebelow.

In order to limit unnecessary drain on the batteries of the unit a suitable on-off switch is provided. Preferably, and as shown, this switch is operated upon the insertion of a flash unit into the socket. The on-off switch is formed by a pair of spring contacts 50–51 which are arranged to be closed by the downward movement of a sleeve 52 surrounding the socket post 25. This sleeve is provided with a flange 53 adapted to bear against the spring arm 54 of contact 50 and force the latter downwardly. As shown in FIGURE 4 spring arm 54 is preferably made of a general yoke shape partially surrounding post 25 and secured as at 55 to the housing. Sleeve 52 is adapted to be engaged by and pushed downwardly by the lower edge of contact ring 20 of the flash bulb unit 12 during insertion of the latter into the socket 11.

Turning now to FIGURE 5, this figure shows the circuitry used to control the firing of the individual flash bulbs and the energization and de-energization of the stepping or release solenoid 43 to bring about the advancement of the socket from one bulb firing position to the next. In this diagram, the various switches are shown in the condition in which they would be with the socket and bulb assembly rotated as far as they can go in a clockwise direction, with the detent 37 engaging the abutment 33 on the detent cam, as shown in FIGURE 3. Under these conditions both the on-off switch 50–51 and the reset switch 47–48 will be closed and one of the flash bulbs will be in electrical circuit with the contact springs 40–41 ready for firing. The firing circuit for the individual flash bulbs extends from the positive terminal 60 of a battery 61 through contacts 50–51 of the off-on switch and contacts 47 and 48 of the reset switch, through the particular flash bulb by way of spring contacts 40 and 41 and thence through a diode 62 and silicon controlled rectifier 63 back to the negative side of the battery 64. Silicon controlled rectifier 63 is normally non-conducting and acts as an open switch in this firing circuit until it is triggered to an on condition. Such triggering is controlled by a silicon controlled switch 65 which in turn is controlled by the photocell 13. As shown in FIGURE 5 the anode 66 of silicon controlled switch 65 is directly connected to the anode 67 of silicon controlled rectifier 63. The cathode 68 of silicon controlled switch 65 is connected by way of a resistor 69 to the negative side 64 of the battery. Like silicon controlled rectifier 63, silicon controlled switch 65 is normally biased to its off or non-conducting condition. To this end, a biasing network comprising resistor 71 and a potentiometer 72 is connected as a voltage divider from contact 51 to the negative side of the battery 64. In order to stabilize the voltage obtained from this dividing network, a silicon diode 73 is connected in a forward conducting direction from the junction 74 to the negative side of the battery. The cathode gate 75 of silicon controlled switch 65 is connected by way of a resistor 76 to the adjustable tap 77 on potentiometer 72, the latter being adjusted so as to apply sufficient positive bias to the cathode gate 75 to bring it just below its firing potential. Photocell 13, which is a silicon cell of the photovoltaic type, is arranged with its negative side connected to the tap 77 on potentiometer 72 and its positive side connected through parallel arranged resistor 78 and capacitor 79 to the cathode gate 75. With such an arrangement a sudden increase in illumination falling on cell 13 will produce a voltage pulse which will be transmitted through capacitor 79 and cause sufficient increase in current flowing between the cathode gate 75 and cathode 68 of the silicon controlled switch 65 to trigger the latter to its on or conducting state. The resulting current flow through resistor 69 in the anode cathode path will produce a positive potential which is applied to the control gate 80 of the silicon controlled rectifier 63 to in turn trigger the latter to its on or highly conducting condition effectively placing the bulb 17 to be fired directly across the battery 61 and causing this bulb to be fired.

It will be noted that solenoid 43 is connected from terminal 48 of the reset switch to the anodes of the silicon controlled rectifier and silicon controlled switch. This in effect places the solenoid in parallel with the filament of whichever bulb is, at any particular instant, in contact with the contact springs 40–41. However, solenoid 43 has sufficiently high impedance that it is unaffected by the surge of current through the silicon controlled rectifier 63 until the flash bulb 17 has actually fired, thereby breaking its filament connection. At this point the current must therefore flow through solenoid 43 and will energize the latter causing it to repel the permanent magnet 44 and release the detent pin 37 from engagement with abutment 33 on the detent disc 26. As previously described the spring 28 will thereupon cause rotation of the complete socket assembly 90° until the next abutment 34 comes into engagement with the detent 37. During this movement the lobe 49 on the cam disc 27 will move away from contact arm 47, causing the latter to move away from its associated contact 48 to open the reset switch and thereby de-energize solenoid 43. As a result, by the time the unit has rotated through its 90° distance corresponding to the next bulb position, the detent lever 38 will again have been swung into a position wherein the pin 37 will engage and stop the next abutment 34, thereby holding the socket unit in position wherein the next bulb 17 is ready for firing. Opening of the reset switch 47–48 also opens the anode cathode circuit of both the silicon controlled rectifier and the silicon controlled switch so that they will each be restored to their normal non-conducting condition. As the socket member moves into position bringing the following bulb into firing position, the reset switch 47 will once again be closed by the corresponding lobe on cam 27 and the operating potential will once again be applied to the anodes 66 and 67 of the silicon controlled switch 65 and silicon controlled rectifier 63 respectively. However, neither of these units will be fired by such operation since it requires a triggering potential on their respective control gates before these units will be rendered conductive.

As previously mentioned, the unit includes an indicator lamp 16 for the purpose of showing that at any particular time the unit is in condition for firing of a flash bulb. As shown in FIGURE 5 this lamp 16 is connected from contact 41 to the negative side of the line by way of a resistor 81. It will be noted that as long as switches 50 and 47 are closed and a bulb with a good filament is in contact with the contact fingers 40–41, current will flow through lamp 16 causing it to light to indicate to the operator that the unit is in operating condition. Resistor 81, together with the resistance of lamp 16, is sufficiently high to prevent the current flowing through the lamp bulb 17 from reaching a value sufficiently high to cause firing of the bulb 17 until actual triggering of the silicon control switch 65 and silicon controlled rectifier 63. Diode 62 prevents current flowing through the indicator lamp 16 by way of the solenoid 43.

As is well known, silicon controlled switches are somewhat sensitive to ambient temperature conditions so far as their triggering values are concerned. By using a silicon diode at 73, any change due to such temperature effect on the current flow between the cathode gate 75 and cathode 68 will be compensated by a corresponding variation in current through diode 73 and a consequent correction of the bias to counteract the adverse temperature effect. Silicon controlled switches also have a tendency to occasionally fire upon the application of anode voltage thereto. To avoid any possibility of this occurring, a resistor 82 is connected between the positive terminal 60 of battery 61 and the anode gate 83 of the silicon control switch. It will be noted that this circuit is completed at all times, but current flow is so small through this circuit that it has no appreciable effect upon battery life.

While obviously various silicon controlled rectifiers, and switches, and other components could be used, the following components and values have been found to be extremely effective.

Battery 61 _____ 6 v.
Diodes 62 and 73 _____ G.E.—Type S–129.
S.C.R. 63 _____ G.E.—Type C6U.
S.C.S. 65 _____ G.E.—Type 3N81.
Lamp 16 _____ G.E.—Type 2158D.
Resistors:
    69 _____ 100 ohms.
    71 _____ 10 kilohms.
    72 _____ 12 kilohms.
    76 _____ 39 kilohms.
    78 _____ 1.5 megohms.
    81 _____ 180 ohms.
    82 _____ 150 kilohms.

The operation of my improved slave lamp is believed to be obvious from the above description. Summarizing the operation briefly, the slave unit is positioned in the desired location and a multilamp flash unit 12 is plugged into the socket 11. As previously described this action will close the on-off switch 50–51, placing the apparatus in readiness for operation. The multilamp flash unit 12 is then rotated in a clockwise direction against the spring tension until it comes to a final stop. At this time the first bulb to be fired will be in operating position and this will be indicated by lamp 16 being lit. The photocell 13 will be positioned in the proper orientation by rotating plastic cylinder 14 until the arrow 15 points toward the main or master flash unit. The slave flash unit is now in readiness for automatic opeartion in response to the master flash unit.

When, now, the master flash unit is fired the sudden pulse of light falling on photocell 13 will trigger the silicon controlled switch 65 which, in turn, will cause the silicon controlled rectifier 63 to be conductive. This will permit current to flow through the first flash bulb 17 of sufficient magnitude to fire the flash. As soon as the flash bulb 17 fires, the solenoid 43 of the stepping mechanism will be energized to release the socket assembly and permit it to rotate 90° into a position where the next flash bulb 17 will be in readiness for firing. During this movement the reset switch 47 will be briefly opened to interrupt the anode circuit to the silicon controlled rectifier 63 and silicon controlled switch 65 passing through the solenoid 43. When switch 47 is again closed as the unit reaches its second firing position, the conditions will be the same as before. Thus up to four separate flash exposures may be made using this slave flash unit without further attention by the operator. After firing of the last of the four flash bulbs, lamp 16 will no longer be illuminated and this will serve as a signal to the operator that a new multilamp flash unit should be inserted into the socket of the slave unit.

While but one embodiment of the invention has been shown and described, it will be obvious to those skilled in the art that many variations may be made without departing from the spirit and scope of the invention as defined by the appended claims.

We claim:
1. A slave-flash system comprising:
    means for supporting a plurality of flash bulbs in a predetermined arrangement;
    a normally inoperative firing circuit for said bulbs, including a source of firing potential;
    contact means for selectively connecting each of said plurality of flash bulbs, one at a time, in firing relationship with said firing circuit;
    photo-electric control means responsive to a predetermined increase in ambient illumination to render said firing circuit operative to fire a bulb connected to said firing circuit at that particular time; and
    actuating means responsive to the firing of one of said bulbs to cause said contact means to connect another of said bulbs in firing relationship with said firing circuit.
2. The invention of claim 1,
    said supporting means comprising a socket mounted for movement relative to said contact means,
    and detent means for releasably holding said socket in each of a plurality of predetermined positions, in each of which a corresponding one of said bulbs will be electrically connected by said contact means in firing relationship with said firing circuit.
3. The invention of claim 2,
    said actuating means including a solenoid operative when energized to release said detent means to permit stepping of said socket to another of said predetermined positions,
    said solenoid being connected to said contact means so as to be effectively in parallel with a bulb positioned in firing relationship to said contact means.
4. The invention of claim 3,
    said firing circuit including normally closed reset switch means, opened in response to stepping movement of said socket means to render said circuit ineffective to fire another of said bulbs until said circuit is once again rendered operative by said photo-electric control means.
5. The invention of claim 1, further including
    reset means responsive to the firing of one of said bulbs for rendering said firing circuit ineffective to fire another bulb until said circuit is once again rendered operative by said photo-electric means.
6. The invention of claim 1, further comprising
    indicator means connected to said firing circuit to indicate electrical continuity through a bulb in firing relationship with said circuit without causing firing of such bulb.
7. A slave-flash system comprising
    a support for receiving and supporting a plurality of flash bulbs in a predetermined arrangement, said support being mounted for step-by-step movement into a corresponding plurality of positions in each of which one of said bulbs will be in a predetermined firing position;
    a normally inoperative firing circuit for said bulbs, including a source of firing potential, and a pair of contacts for electrically connecting a bulb located at said firing position into said firing circuit;
    control means for said firing circuit, including a photo-electric device, said control means being responsive to a predetermined increase in ambient illumination on said photo-electric device to render said firing circuit operative to cause firing of a bulb in said firing position; and
    actuating means rendered operable upon such firing of a bulb to cause stepping of said support to bring another of said bulbs into said firing position.
8. The invention of claim 7,
    said firing circuit including solid-state switch means, having a control gate, for regulating current flow through said firing circuit;
    said control means being arranged to normally bias the control gate of said solid-state switch means so as to render the latter substantially non-conductive;
    said photo-electric device being effective to vary the bias on said control gate to trigger said solid-state switch into a highly-conductive state to thereby render said firing circuit operative.
9. The invention of claim 8 further including
    reset means operative in response to such operation of said firing circuit for momentarily interrupting current flow through said solid-state switch means whereby to restore it to its normally non-conductive state.
10. The invention of claim 7,
    said firing circuit including a silicon controlled rectifier, having its anode and cathode connected in series in said circuit for regulating current flow therethrough;

said silicon controlled rectifier including a control gate effective to trigger said rectifier from a non-conductive to a conductive state;

said control means including a normally non-conducting silicon controlled switch and means connecting its anode and cathode in series with a load resistor across said source of firing potential, said silicon controlled switch having a cathode gate;

said photo-electric device being operatively connected to said cathode gate whereby a predetermined rate of increase of illumination on said device will cause said silicon controlled switch to draw current through said load resistor;

said control gate of said silicon controlled rectifier being responsive to the resulting potential drop across said load resistor to trigger said rectifier to its conductive state whereby to render said circuit operative to fire a bulb at said firing position.

11. The invention of claim 10, further including reset means responsive to such operation of said firing circuit for momentarily interrupting current flow through the anode-cathode paths of both of said silicon controlled devices whereby to restore them to their normal, non-conductive states.

12. The invention of claim 11, said reset means including normally closed switch means interposed between said silicon controlled devices and said source of potential, said last mentioned switch means being operatively controlled by stepping movement of said support to momentarily open during each such stepping movement.

13. The invention of claim 10, said control means including a resistive voltage-dividing network connected across said source of potential;

a resistor connecting an intermediate point on said network to the control gate of said silicon controlled switch to apply a predetermined bias potential thereto;

said photo-electric device being of the photo-voltaic type; and said photo-electric device being connected in series with a capacitor, in shunting relation to said last-mentioned resistor, whereby only relatively abrupt increases in illumination on said photo-electric device will be effective to vary the bias on said cathode gate sufficiently to render said silicon controlled switch conductive.

14. The invention of claim 13 said control means further including a silicon diode, connected in a forward conducting direction across a portion of said dividing network whereby to stabilize the bias potential applied to said cathode gate and to compensate for the effect of temperature changes upon the cathode-cathode gate junction of said silicon controlled switch.

References Cited by the Examiner

UNITED STATES PATENTS

| | | | |
|---|---|---|---|
| 2,336,633 | 12/1943 | Parson | 67—31 |
| 2,486,010 | 10/1949 | Edgerton | 67—31 |
| 2,508,242 | 5/1950 | Finkelstein | 67—31 |
| 2,546,734 | 3/1951 | Farber | 67—31 |

JAMES W. WESTHAVER, *Primary Examiner.*